US006745058B2

(12) United States Patent
Boulay et al.

(10) Patent No.: US 6,745,058 B2
(45) Date of Patent: Jun. 1, 2004

(54) TELEPHONE PROVIDED WITH A CONNECTED ANTENNA

(75) Inventors: Philippe Boulay, Bazougers (FR); Luc Pierart, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/453,920

(22) Filed: Apr. 28, 2000

(65) Prior Publication Data

US 2003/0063738 A1 Apr. 3, 2003

(30) Foreign Application Priority Data

May 3, 1999 (FR) ............................................ 99 05598

(51) Int. Cl.[7] ............................. H04B 1/38; H04Q 1/24
(52) U.S. Cl. ..................................... 455/575.7; 343/702
(58) Field of Search ........................ 379/433.11, 433.01; 455/90.3, 575.7; 343/702, 895, 900, 901

(56) References Cited

U.S. PATENT DOCUMENTS

| | | | | |
|---|---|---|---|---|
| 5,731,791 | A | | 3/1998 | Jang |
| 5,801,662 | A | | 9/1998 | Itoh |
| 5,835,065 | A | | 11/1998 | Wallace et al. |
| 5,835,071 | A | * | 11/1998 | Phelps ........................ 343/702 |
| 5,867,127 | A | | 2/1999 | Black et al. |
| 5,880,696 | A | * | 3/1999 | Koleda ....................... 343/702 |
| 6,166,697 | A | * | 12/2000 | Granqvist et al. .......... 343/702 |

FOREIGN PATENT DOCUMENTS

EP 0 476 144 A1 3/1992

* cited by examiner

*Primary Examiner*—Jack Chiang
(74) *Attorney, Agent, or Firm*—Sughrue Mion, PLLC

(57) ABSTRACT

A telephone including an antenna provided with mechanical means for holding the antenna in an opening of a housing of the telephone. The opening of the housing opens out to a cavity containing a printed circuit, such that a protuberance at one end of the antenna is in contact with a metal area of the printed circuit.

13 Claims, 4 Drawing Sheets

TELEPHONE PROVIDED WITH A CONNECTED ANTENNA

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

The present invention proposes a telephone provided with a connected antenna. It is used more particularly in telecommunications applications, in particular in the field of mobile telephones. Mobile telephones are generally provided with a printed circuit connected to a signal transceive antenna. The advantage of the invention is that it proposes a telephone including an antenna that is connected simply to the printed circuit.

DESCRIPTION OF RELATED ART

In the prior art, a mobile telephone mainly includes a housing, a signal transceive antenna, and a printed circuit. In general, the antenna is mounted on a connector. An antenna screwed onto a connector is known in particular from document U.S. Pat. No. 5,603,630. The assembly constituted by the connector and the screwed-on antenna is inserted in a recess of the housing accepting the connector. The connector provides electrical connection with the printed circuit in direct manner. The recess also presents devices for holding the connector in the housing in reversible manner. For example, the recess in the housing includes devices provided with springs and a lever.

In addition, an extractable antenna cable is known from document EP-A-0 519 411, which includes antenna segments that are held together by a system of strips. Each segment presents a strip extending around its circumference. The strips are compressible. They serve firstly to keep the interfitting segments together, and secondly to provide contact between the various segments of the antenna. In order to be connected to a printed circuit, the extractable antenna requires a connection via a wire soldered between one end of the antenna and a conductive area of the printed circuit. In another example, the antenna must be held in place by a connector mounted on the printed circuit. A retractable antenna is known from document U.S. Pat. No. 5,342,213, which presents resilient catches around its circumference so as to be held in place in a cavity of a telephone housing. The antenna is connected to a connector housed in the bottom of the housing, and is thus connected to a printed circuit.

Prior art antennas pose a problem. The system for connecting a prior art antenna to a printed circuit requires an intermediate connection. A prior art telephone generally includes a first intermediate device to support the antenna, and a second intermediate device to make electrical contact with a printed circuit. In patent U.S. Ser. No. 603,630, the first intermediate device includes, in particular, a nut into which the antenna is screwed, and the second intermediate device is a connector enabling contact to be ensured between the first intermediate device and the printed circuit. In addition, in document EP-A-0 519 411, the telescopic antenna proposed also requires one or more intermediate connectors to ensure connection between the antenna and the printed circuit. In document U.S. Ser. No. 342,213, the antenna provided with resilient catches is connected to an intermediate connector. Another drawback of the prior art is that it requires the step of mounting the antenna to be performed after the various electrical elements of the telephone have been mounted.

OBJECTS AND SUMMARY OF THE INVENTION

An object of the invention is to remedy the above-mentioned problem by proposing a telephone including a housing and an antenna, the antenna being contained in a duct of the support so as to be in direct electrical contact with a printed circuit contained inside the housing. The antenna is held inside the housing by mechanical means. The mechanical means is presented by the antenna having a particular shape. In particular, the mechanical means can be a resilient catch presented by the antenna, the resilient catch engaging in a notch of the housing. The antenna is disposed inside the housing so that one of its ends is held against a conductive area of the printed circuit. In addition, another advantage proposed by that solution is that it is easy to mount such an antenna in a housing. In addition, the antenna can be mounted before the electrical components are put in place inside the housing of the telephone.

The invention thus provides a telephone including a housing, a circuit received in a cavity of said housing, and an antenna assembly comprising an antenna segment held by mechanical means in an opening of said housing, wherein the antenna assembly includes a protuberance that bears against a conductive area of the circuit.

BRIEF DESCRIPTION OF THE DRAWING

The invention will be better understood on reading the following description and on examining the accompanying figures. The description and figures are presented only by way of non-limiting indication of the invention. The figures show.

MORE DETAILED DESCRIPTION

Figure 1:
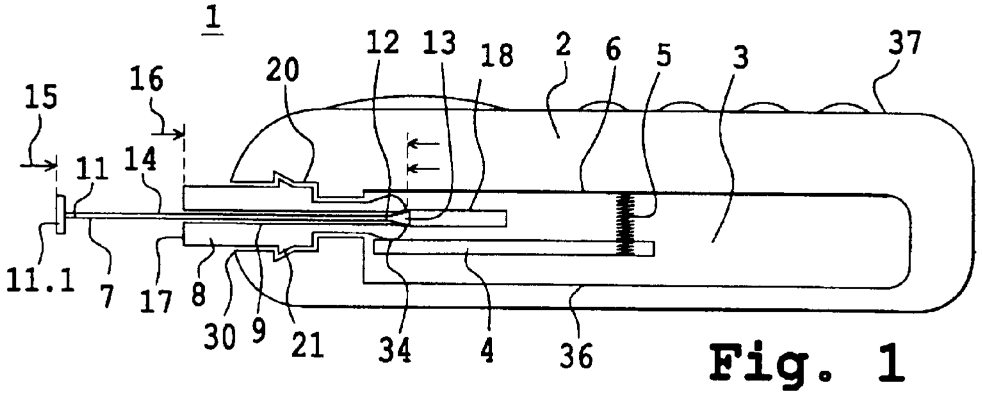
FIG. 1: a section of a telephone provided with an antenna of the invention.

FIG. 1 shows a telephone 1 of the invention. The telephone 1 includes a housing 2. The housing 2 is provided with a cavity 3. The cavity 3 contains, in particular, a printed circuit 4. The printed circuit 4 is held by fixing means 5 against a wall 6 of the cavity 3. In a preferred example of the invention, the fixing means 5 is a screw or a clip. The printed circuit 4 forms a plane, such that said plane is parallel to the wall 6. The telephone 1 also includes an antenna assembly 7. In a preferred example of the invention, shown in FIG. 1, the antenna 7 includes a support 8 and a rod 9. The rod 9 is contained inside a tunnel 10 of the support 8. The rod 9 is held in the tunnel 10, at a first end 11, by a cap 11.1, and at a second end 12, by a bell mouth 13. The rod 9 is mainly constituted by a cylindrical shank 14 connecting the first end 11 to the second end 12. The cylindrical shank 14 is made of metal and its length preferably lies in the range 5 cm to 10 cm.

The outside diameter of the cylindrical shank 14 is less than the inside diameter of the tunnel 10. The rod 9 thus floats slightly, inside the tunnel 10. The rod 9 has a length 15. The support 8 has a length 16. The length 16 is less than the length 15. The rod 9 can thus slide inside the antenna 14 from an "extended" first position, shown in FIG. 1, to a "retracted" second position. In the retracted position, the cap 11.1 bears against an outside surface 17 of the support 8. In the retracted position, the end 12 of the rod 9 projects inside a tube 18. The tube 18 is insulating. The tube 18 prevents undesirable contacts from being made between the rod 9 and other conductive elements contained inside the cavity 3. The tube 18 is situated inside the cavity 3 in line with the tunnel 10.

Figure 2:
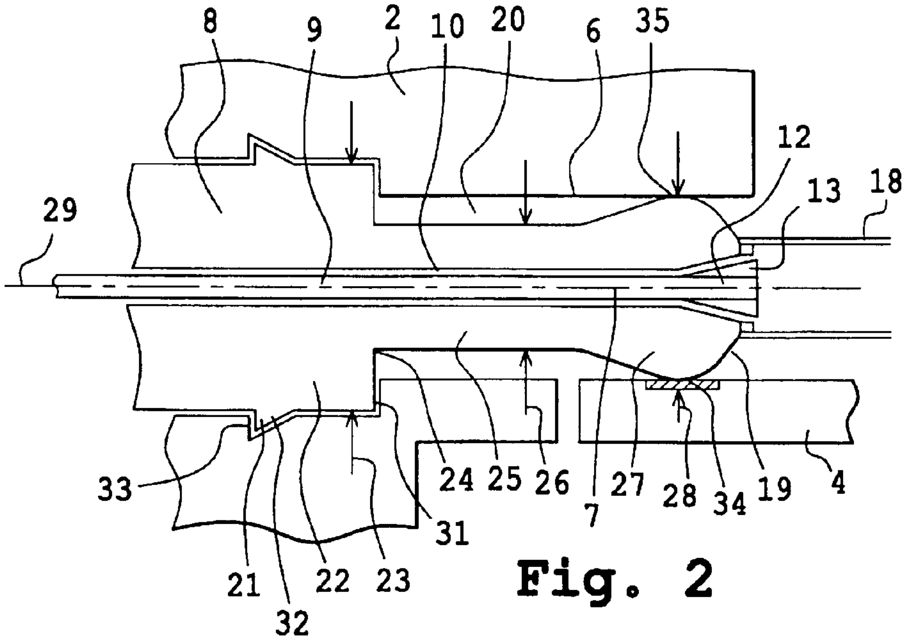
FIG. 2: a section of an antenna of the invention connected to a printed circuit.

The antenna 7 passes through an opening 20 of the housing 2. The opening 20 of the housing communicates with the cavity 3. The antenna 7 includes a mechanical device 21 presented on a cylindrical segment 22 of the antenna. The device 21 is held at the opening 20. In a preferred example of the invention, the mechanical means 21 is presented by the support 8. In FIG. 2, the support 8 has a diameter 23 at the first cylindrical segment 22. The first segment 22 is defined between the end face 17 and a narrowing 24. The support 8 includes a second cylindrical segment 25 of outside diameter 26. The diameter 26 is less than the diameter 23. The second portion 25 is defined between the narrowing 24 and the end 19. At the end 19, the segment 25 is such that the outside diameter 26 increases so as to form a protuberance 27. The protuberance 27 has a diameter 28. The diameter 28 is greater than the diameter 26, and less than the diameter 23.

The support 8 has an axis of symmetry 29. The axis 29 is also an axis of translation of the rod 9 inside the tunnel 10. In addition, the support 8 is inserted along said axis 29 inside the opening 20. The support 8 is inserted in the opening 20 via an orifice 30 presented at one end of the housing 2. The support 8 inserted in the opening 20 is such that the first segment 22 comes into abutment against a wall 31 of the narrowing 24.

In addition, the support 8 is held in the opening 20 by mechanical means 21. In a preferred example of the invention, the mechanical means 21 is a resilient catch. The first segment 22 thus includes a collar 32. The collar 32 has a triangular profile. More particularly, the collar 32 has a barb-shaped profile. The collar 32 is such that during insertion of the support 8 into the opening 20, one edge of the triangular profile of the collar 32 is pressed down against a wall of the opening 20, in such a manner that the same triangular profile returns to its non-constrained shape when the collar 32 is engaged in a notch 33. The notch 33 has a profile that is also triangular and complementary to the profile of the collar 32. The collar 32 and the notch 33 form the resilient catch. The resilient catch can withstand an extraction pressure of about several decanewtons per square meter. In another example of the invention, the mechanical means 21 for holding the support 8 inside the opening 20 is constituted by integrally molding the housing 2 about the first portion 22. With integral molding, the protuberance 27 is not included in the mold. The protuberance 27 is free in the cavity 3.

The protuberance 27 can be in contact with a location 35 on the wall 6 of the housing 2. The wall 6 is thus insulating. Before the antenna is mounted, the disposition of the printed circuit 4 in the cavity 3 is such that the distance separating the plane formed by the printed circuit 4 and the plane formed by the wall 6 is less than the diameter 28. Thus, when the circuit 4 is mounted in the housing 2, the protuberance 27 is held between a metallization 34 of the printed circuit 4 and the location 35 on the wall 6. Since the support 8 is conductive, the signals transmitted and received by the transceive antenna 7 are directly transmitted to the metallization 34 of the printed circuit 4.

In a preferred embodiment of the invention, the wall 6 is opposite a wall 36. The wall 36 is closest to a front face 37 presenting a transmitter, a receiver, and the key pad of the telephone 1. The printed circuit 4 is thus interposed between the end 12 of the antenna 7 and the head of a person using the telephone. The head is thus distanced from the waves transmitted by the antenna 7.

In a first variant, the wall 6 is metal. Contact between the wall 6 and the antenna 7 is thus undesirable. Since the antenna 7 is symmetrical about the axis 29, the axis 29 also constitutes an axis for inserting the antenna 7 in the cavity 3. Before the antenna 7 is mounted, the distance between the axis 29 and a plane formed by the printed circuit 4 is thus less than half the diameter 28. In this case, the distance between the printed circuit 4 and the wall 6 is greater than the diameter 28. The antenna 7 is thus in contact with the printed circuit 4 at the protuberance 27, without the protuberance 27 being in contact with the wall 6.

Figure 3A:
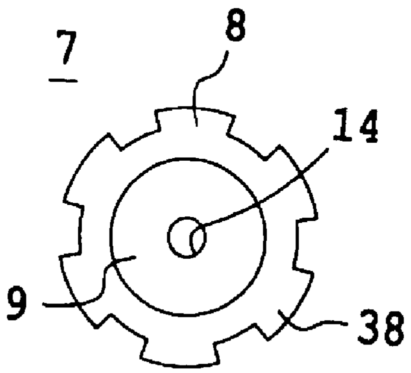
FIG. 3*a*: a section of an antenna of the invention on a plane perpendicular to an axis of said antenna.

The protuberance 27 is symmetrical about the axis 29. The overall outside shape of the protuberance 27 is spherical. FIG. 3*a* shows the profile of the protuberance 27 perpendicular to the axis 29. In a preferred embodiment of the protuberance 27, the profile is notched around its periphery. The profile includes a notch 38. In a preferred example of the invention, shown in FIG. 3*a*, it includes six notches, such as the notch 38, that are evenly distributed around the circumference of the protuberance 27.

Figure 3B:
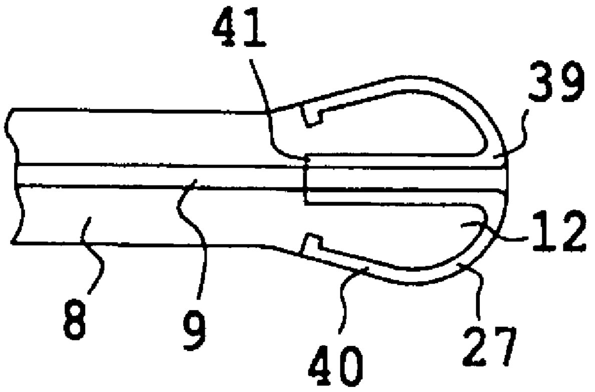
FIG. 3*b*: a longitudinal section of one end of an antenna of the invention.

In a variant of the invention, shown in FIG. 3*b*, the protuberance 27 is a bushing 39 having tabs 40 that are curved towards the outside of said bushing 39. The tabs 40 form notches such as the notch 38. A cylindrical portion 41 of the bushing 39 is situated in line with the tunnel 9 of the support 8. The tabs 40 bulge so as to form the protuberance 27. The tabs 40 are flexible. They can be held against a printed circuit.

The bushing 39 can be mounted in the support 8. It can also be integrally molded in the support 8. In this variant, the support 8 can be made of insulating material. The support 8 does not come directly into contact with the printed circuit 4. The tabs 40 of the bushing 39 ensure contact with the printed circuit 4. In addition, this variant has the advantage of proposing an antenna that is lighter and less costly.

DEPOSIT OF COMPUTER PROGRAM LISTINGS

Not Applicable

What is claimed is:

1. A telephone including:

a housing;

a circuit received in a cavity of said housing; and an antenna assembly comprising an antenna segment held by mechanical means in an opening of said housing, the antenna assembly including a protuberance that bears against a conductive area of the circuit, wherein the antenna assembly comprises, an antenna rod, and a conductive support, the conductive support forming the antenna segment and the protuberance of the antenna assembly, and further wherein said protuberance is bulbous at its end.

2. The telephone according to claim 1, wherein the protuberance is a bushing mounted at one end of the conductive support.

3. The telephone according to claim 2, wherein the bushing is integrally molded or mounted on the conductive support.

4. The telephone according to claim 2, wherein a profile of the bushing, perpendicular to an axis, is notched around its periphery.

5. A telephone according to claim 2, wherein the bushing includes bulging tabs pressed down along the bushing and forming the protuberance.

6. A telephone according to claim 1, wherein the protuberance is flexible.

7. The telephone according to claim 1, wherein an axis for inserting the antenna assembly in the housing is parallel to a plane formed by the circuit, and wherein a height, before mounting the antenna assembly in the housing, between said axis and said plane, is less than half the diameter of the protuberance.

8. The telephone according to claim 1, wherein the housing is integrally molded about the antenna segment.

9. The telephone according to claim 1, wherein the mechanical means includes a collar of the antenna segment having a triangular profile and a notch of an internal wall of an orifice in said housing having a shape that is complementary to said triangular profile of said collar.

10. A telephone including a housing, a circuit received in a cavity of said housing, and an antenna assembly comprising an antenna segment held by mechanical means in an opening of said housing, the antenna assembly including a bulbous protuberance that bears against a conductive area of the circuit, wherein the antenna assembly comprises an antenna rod and a conductive support, the conductive support forming the antenna segment and the bulbous protuberance of the antenna assembly, wherein an inner surface of said housing pushes said protuberance against said conductive area of said circuit.

11. The telephone of claim 1, wherein said protuberance comprises a protruding knob.

12. The telephone of claim 1, wherein an inner surface of the housing pushes said protuberance against a conductive area of said circuit.

13. The telephone of claim 1, wherein a tangent of the protuberance is between a conductive area of the circuit and the housing.

* * * * *